UNITED STATES PATENT OFFICE.

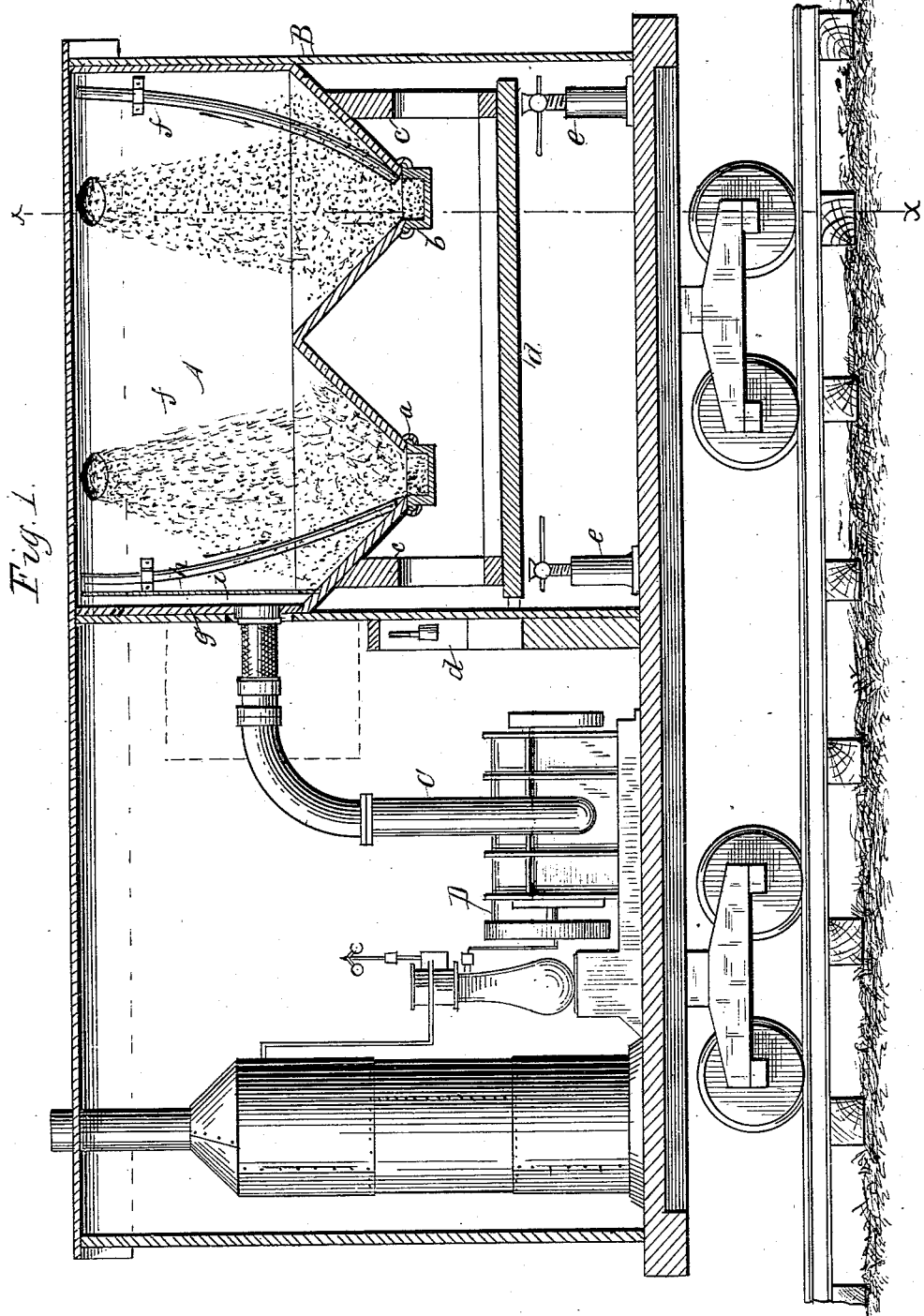

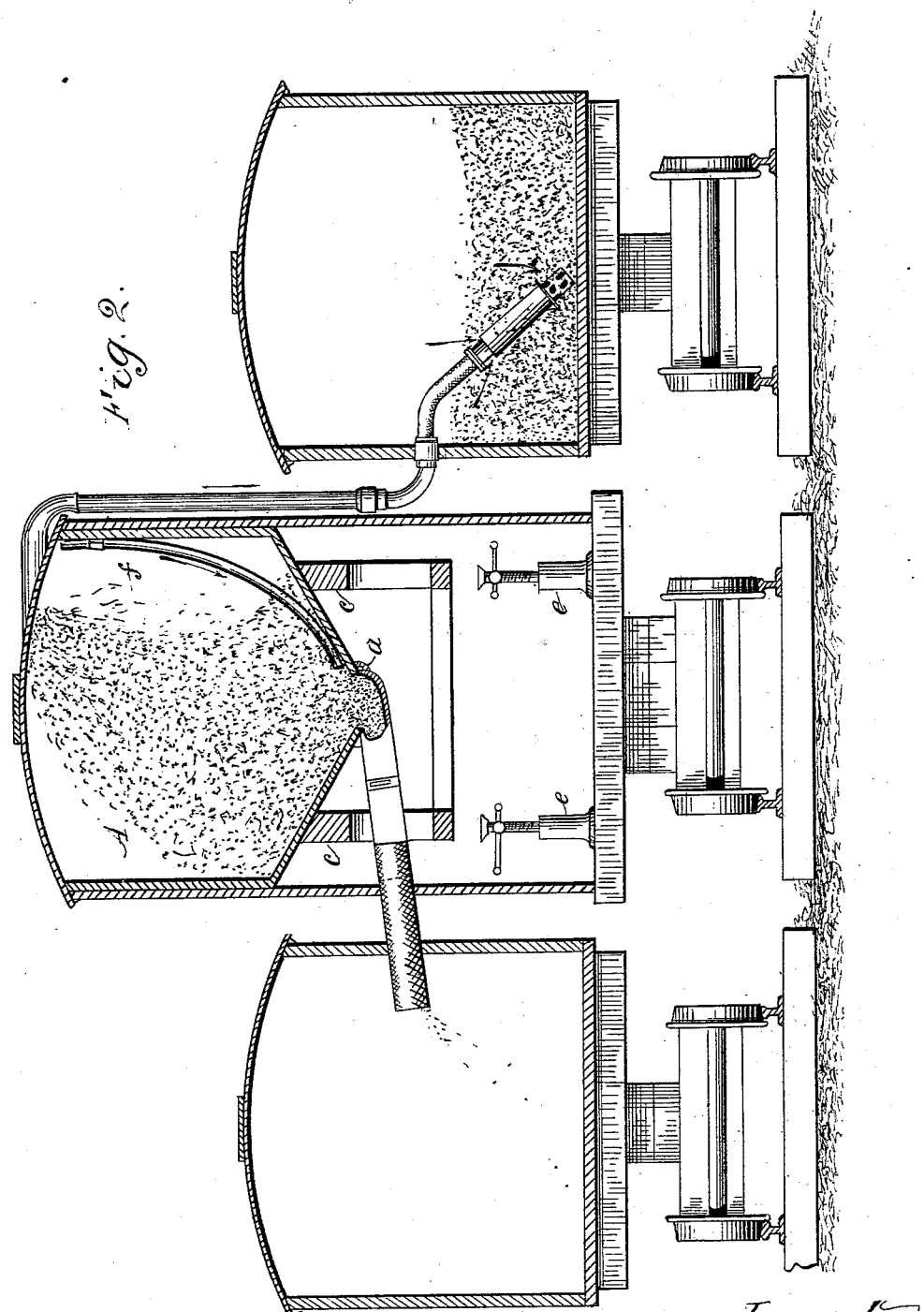

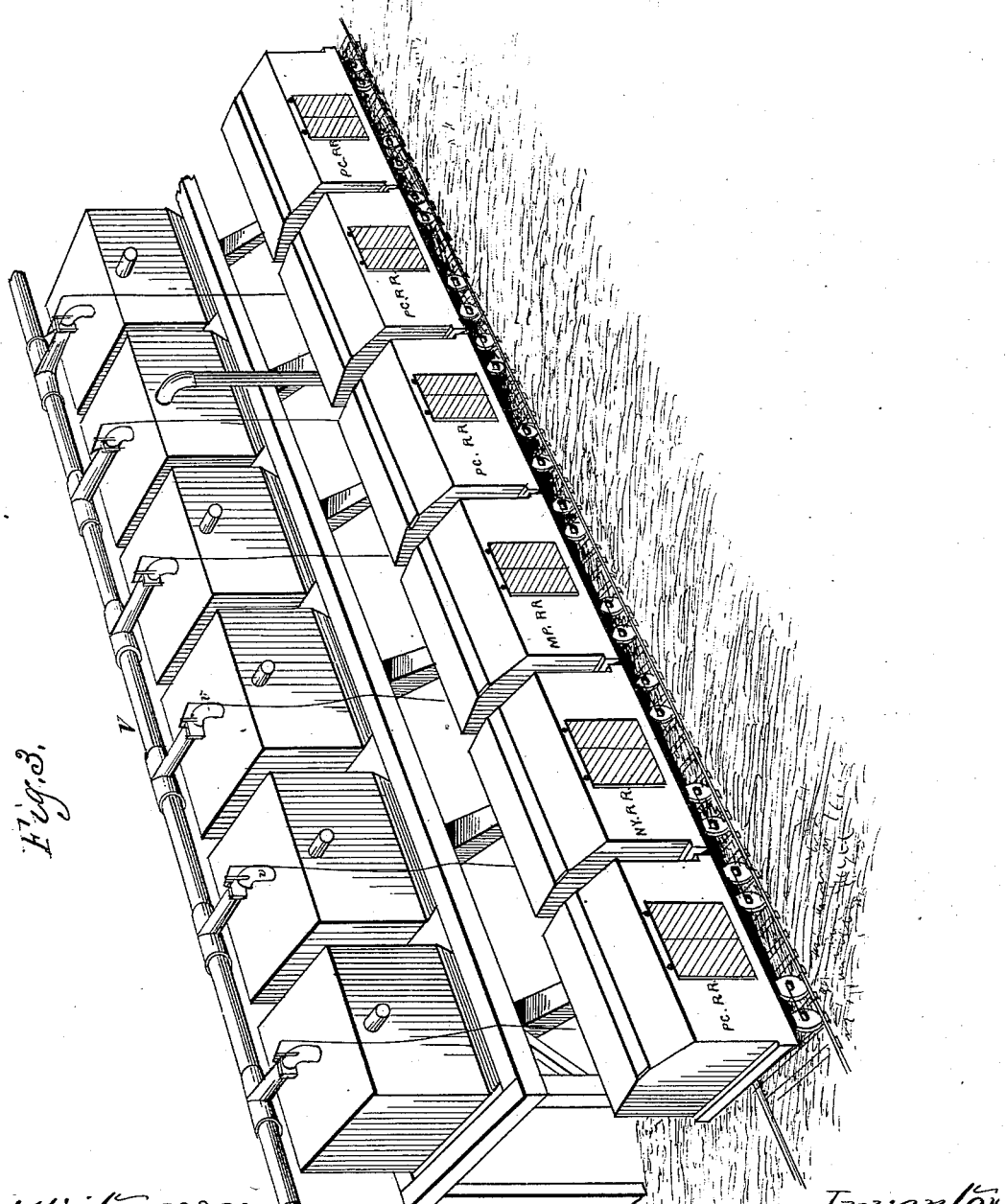

LYMAN SMITH, OF KANSAS CITY, MISSOURI.

PNEUMATIC AND AUTOMATIC GRAIN-TRANSFER APPARATUS.

SPECIFICATION forming part of Letters Patent No. 279,034, dated June 5, 1883.

Application filed April 26, 1883. (No model.)

*To all whom it may concern:*

Be it known that I, LYMAN SMITH, of Kansas City, in the county of Jackson and State of Missouri, have invented certain new and useful Improvements in Pneumatic Automatic Grain-Transfer Apparatus; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention has relation to a new and useful apparatus for the transfer of grain and other substances from one car to another, or to and from a series of cars simultaneously, and is an improvement upon patents granted to me, which are numbered, respectively, 268,303 and 268,305, for pneumatic process for removing grain.

The object of the present invention is to provide a pneumatic system and apparatus for transferring grain or other material from one place of storage to another, which in this instance is designed to be applied principally to railroad-cars, whereby the load of one car is rapidly transferred to another, whether the cars be end to end or side to side, or across or under cars, or under roadways, or to stationary bins, vessels, &c., or to such points as can be reached by my pneumatic process by means of tubing. A further object is to utilize, in connection with my pneumatic system, the ordinary weighing-scales now in general use, so that a whole car-load of grain or other material may be weighed on its transit from one car to another, or to weigh what is known to be a car-load when the grain is transferred from a vessel or storage-place of larger dimensions or bulk than the capacity of a car.

Heretofore the methods have been to shovel the grain, or to elevate it by means of the old-time buckets used in mills, or to run cars up incline planes and let the grain empty itself by gravity to a car below, all of which means are cumbersome, wasteful, and expensive, and, more than all, very slow, as time now is a great consideration. Therefore to remedy these evils and to rapidly facilitate and cheapen the transfer of grain from car to car or other places of storage are further objects of my invention.

My invention consists in arranging upon a car of suitable dimensions an air-tight hopper of any suitable design or contour, which hopper is calculated to contain the load of an ordinary grain-car, and which hopper is provided with inlet and outlet tubes, and with an exhausting apparatus for producing a vacuum in said hopper, whereby the grain is sucked out of one car into the hopper, and by a reversal of the direction of the exhausting apparatus it becomes a blower, and thus by the same apparatus that causes the grain to rush into the hopper also causes it to be blown out into the car to be loaded, evenly distributing it all over the bed of the car, the grain in the meantime having been weighed by the operator.

It further consists in the combination, with an air-tight hopper, of an exhausting and blowing apparatus, motive power for operating the same, and suitable connections, whereby the grain is transferred from one car to another by pneumatic means, and in further details of construction, as will more fully hereinafter appear.

Referring to the drawings hereunto annexed, Figure 1 illustrates a vertical longitudinal section of a car, showing the operating mechanism in elevation and the air-tight bin or hopper in section. Fig. 2 shows a vertical transverse section of the air-tight bin or vacuum-chamber, and a transverse section of the air-tight bin or vacuum-chamber, and a transverse section of two cars in position for the transfer of grain from one to the other through the medium of my pneumatic apparatus, and by which the relative position of the cars with the exhaust-chamber is shown. Fig. 3 illustrates a series of stationary bins, into which any number of cars may be unloaded for future transportation, or into the cars of different railroads, and to which branch pipes U from a main, V, may lead in such manner that either may be controlled at will. I prefer to make these bins sufficiently high above the ordinary car that the grain will readily fall by its own gravity when the internal pressure is not used. Any number of these bins may be used, and at any suitable distance from the place of unloading.

In the drawings, A is the exhausting-chamber, preferably provided with a double conical bottom, *a b*, so that when discharging the grain from the hopper or bin it may be taken from two points and delivered to both ends of the car to be loaded. In this way the car is automatically trimmed and the grain evenly distributed over the whole bed of the car. The hopper A is adapted to fit snugly within a box-car, B, and to slightly rise up and down upon supports c, which rest upon a scale, d, of the Fairbanks type, by means of which the entire car-load is weighed at once. Beneath the scale or platform, and at suitable distances apart, I locate jack-screws e e, for the purpose of leveling the platform-scale when weighing the grain, should the sidings or tracks be uneven, as they often are.

When discharging the grain it sometimes happens that it becomes choked at the point of exit. To overcome this I locate an air-tube, f, at a suitable position within the hopper. It extends sufficiently high to prevent the grain from entering its mouth, and down to a point within the discharge-opening, so that when pressure is let onto the hopper the air passing down the pipe f through the grain to the point of exit forces the grain out of the discharge-mouth, and thus not only prevents it choking up, but also facilitates its discharge. The mouth of the forcing-pipes may be provided with wire-cloth, to prevent the entrance of grain or other extraneous matter. This bin is provided at its exhausting end g with a partition or diaphragm, h, which runs transversely across the width of the bin, and nearly to its top, between which and the wall is formed an exhaust-chamber, i. To this chamber i, I attach the pipe C at one end, which connects to the exhauster and blower D at its other end, and by means of which the air is exhausted from the hopper or bin A, thereby creating a vacuum therein. The diaphragm extends to nearly the roof of the hopper, so that the grain cannot be carried over into chamber i. A dust-trap may be interposed between the exhauster and the hopper-bin, as desired, into which the dust, chaff, or other lighter particles of grain may be drawn and trapped, and which also prevents the dust from being drawn into the exhauster. This feature, however, is so well explained, and so clearly illustrated in my other patents, before referred to, that it will not be enlarged upon in this application. I may, however, remark that a water-spray in a suitable chamber may be used for arresting the dust, or that the air may be drawn through a thin film of water in a trap, by which the dust drawn from the grain while in transit would be trapped. All such details of construction will form the subject-matter of another application.

Upon the other end of the car I locate an ordinary blower-exhauster and motor known as the "Baker," and also a steam-generator to supply motive power for the blower-engine. These being no part of the present invention, and being well known, they will not be claimed, except as auxiliaries in the general system of the process of transfer. I may say, however, that their relative arrangement has been kept in view in making up a complete, substantial, and effective grain-transfer apparatus. The suction-pipes, swivels, joints, &c., are shown in position in Fig. 2, and which will be understood by the description of operation, which is as follows:

The transfer-car being brought in position relatively to the cars to be unloaded and loaded, the exhaust-blower is put in motion; the air is immediately exhausted from the hopper or bin, which forms a vacuum therein. The flexible hose or pipes are now inserted in the grain in the car to be unloaded, when in a very few minutes the entire load is transferred to the hopper-bin by the suction through the pipes created by the exhauster. The motion of the exhauster is now reversed, which makes of it a blower, and while this is being done the grain in the hopper-bin is weighed. Then the nozzles of the discharge-pipes are inserted in the car to be loaded. The exit-valves are now opened, when the grain is immediately transferred from the hopper-bin to the car. The whole process of unloading, weighing, and loading the other car, or, in other words, transferring the grain from one car to another and weighing it, consumes less than five minutes.

It will be observed that the grain for an instant is not exposed or subjected to rain, waste, dirt, or other loss; but, on the contrary, it is cleaned and ventilated, and therefore benefited, in its passage from one car to the other.

Should it be desired to unload the cars in the vicinity of the station, and to store the grain until it can be conveniently removed, I provide bins at some convenient locality, to which I run a main, from which I run branches, one to each bin, and each branch is controlled by a suitable valve, by which each or any of the bins may be loaded or unloaded, as may be required. These bins may be subjected to the same exhaust and pressure process as the one mounted upon the car, and are of course provided with like pipe-connections and fittings as the mounted bin, and are also provided with weighing facilities.

Along rivers where there are dams, and where water can be raised above the levels of rivers by mill-races, &c., and where there are transfers of grain, coal, sand, &c., I build reservoirs of suitable dimensions and allow the water to flow in them, the reservoirs, of course, to be air-tight, and when I desire to use these reservoirs, or any of them, as an exhausting-chamber, I cause the water to be drawn off, the displacement of which forms a vacuum therein. This vacuum I retain until I open my connections for transfer, when the rush of air toward the vacuum draws the grain or other matter to be loaded in the vessel or car, as will be more fully set forth in a separate application.

It is evident that my principle of transfer may be applied to the transfer of grain from ships to barges or canal-boats, for which a floating apparatus may be erected and applied.

Having thus described my invention and the best mode known to me at present for carrying the same into effect, I desire not to be understood as at all limiting myself to the exact construction shown, as I desire to claim, broadly, the method of transferring grain by pneumatic process from one car to another, or from or to other receptacles about railroad stations or depots where the transmission of grain is essential.

What I claim is—

1. The means herein described of transferring grain, which consists in creating a vacuum or partial vacuum in a suitable vessel mounted upon a railroad-car, then causing the grain to rush into said vessel, then weighing it, then forcing the grain out of the vessel under pressure.

2. The method herein described of transferring grain from one car to another, by first causing a vacuum in a suitable vessel mounted upon a railroad-car, then supplying grain to the sucking action of the vacuum in said vessel, then subjecting the grain to air-pressure, whereby it is ventilated and forced into the car to be loaded.

3. The combination herein described, consisting of the exhaust hopper-bin, the inlet and outlet pipes, with the exhauster and blower, and with the auxiliary force-pipes, for the purpose set forth and described.

4. The combination herein described, consisting of the exhaust and reception hopper-bin, the inlet and outlet pipes, the exhaust-chamber $i$, with the exhauster and blower mounted upon a railroad-car, and with the weighing medium, as set forth.

5. The combination, in an apparatus for transferring grain, consisting of the hopper-bin, inlet and outlet grain-pipes, and the exhauster with the weighing device and the leveling devices, as set forth, and for the purpose specified.

6. The method herein described of transferring grain or other material by pneumatic process, which consists, first, in creating a vacuum or partial vacuum in a vessel, then attaching conduits to where grain is stored, and then opening communication to places of transfer from said vacuum-chamber, then destroying said vacuum by the admission of air to said vacuum-chamber in such manner that its contents will automatically discharge themselves by their own gravity.

7. The combination, in a system for transferring grain by pneumatic means, consisting of the hopper-bins, the pneumatic main for exhausting the bins, the branch pipes provided with controlling-valves, and the loading and unloading conduits, as set forth and described.

In testimony that I claim the foregoing as my own invention I affix my signature in presence of two witnesses.

LYMAN SMITH.

Witnesses:
B. F. MORSELL,
EDWARD E. ELLIS.